(12) United States Patent
Ikegami et al.

(10) Patent No.: US 11,460,090 B2
(45) Date of Patent: Oct. 4, 2022

(54) HELICAL BELT AND BELT TRANSMISSION GEAR

(71) Applicant: Mitsuboshi Belting Ltd., Kobe (JP)

(72) Inventors: Hiroaki Ikegami, Hyogo (JP); Masakuni Yoshida, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 279 days.

(21) Appl. No.: 16/630,272

(22) PCT Filed: Jul. 10, 2018

(86) PCT No.: PCT/JP2018/026105
§ 371 (c)(1),
(2) Date: Jan. 10, 2020

(87) PCT Pub. No.: WO2019/013232
PCT Pub. Date: Jan. 17, 2019

(65) Prior Publication Data
US 2020/0232540 A1    Jul. 23, 2020

(30) Foreign Application Priority Data

Jul. 11, 2017 (JP) .............................. JP2017-135270
Apr. 6, 2018 (JP) .............................. JP2018-073854
Jun. 27, 2018 (JP) .............................. JP2018-121700

(51) Int. Cl.
*F16G 1/28* (2006.01)
*F16G 1/04* (2006.01)
(Continued)

(52) U.S. Cl.
CPC ............. *F16G 1/28* (2013.01); *B62D 5/0412* (2013.01); *F16G 1/04* (2013.01); *F16G 1/10* (2013.01); *F16H 7/023* (2013.01)

(58) Field of Classification Search
CPC ....... F16G 1/04; F16G 1/10; F16G 1/28; F16H 7/023; B62D 5/0412
(Continued)

(56) References Cited

U.S. PATENT DOCUMENTS

2004/0214674 A1   10/2004  Tachibana et al.
2007/0066431 A1    3/2007  Hironaka
(Continued)

FOREIGN PATENT DOCUMENTS

CN         105980739 A       9/2016
CN         106170640 A      11/2016
(Continued)

OTHER PUBLICATIONS

Nov. 4, 2020—(CN) Notification of First Office Action—App 201880045726.3, Eng Tran.
(Continued)

*Primary Examiner* — Gene O Crawford
*Assistant Examiner* — Emily Rose Kincaid
(74) *Attorney, Agent, or Firm* — Banner & Witcoff, Ltd.

(57) ABSTRACT

The present invention relates to a helical toothed belt including: a back portion in which a tension member is buried; and a plurality of tooth portions, in which: the plurality of tooth portions have a tooth pitch of 2 mm or more and less than 4 mm, in a case where the tooth pitch of the plurality of tooth portions is 2 mm or more and less than 3 mm, the back portion has a thickness of 0.4 mm or more and 1.2 mm or less, in a case where the tooth pitch of the plurality of tooth portions is 3 mm or more and less than 4 mm, the thickness of the back portion is 0.6 mm or more and 1.8 mm or less; and the tension member is a twisted cord including a high-strength glass fiber or a carbon fiber.

10 Claims, 5 Drawing Sheets

(51) Int. Cl.
  *F16G 1/10* (2006.01)
  *B62D 5/04* (2006.01)
  *F16H 7/02* (2006.01)

(58) Field of Classification Search
  USPC .................................................. 474/148, 205
  See application file for complete search history.

(56) References Cited

U.S. PATENT DOCUMENTS

| | | | |
|---|---|---|---|
| 2007/0137766 A1* | 6/2007 | Matsuda | F16G 1/28 156/137 |
| 2012/0058851 A1* | 3/2012 | Shimizu | F16G 1/28 474/205 |
| 2015/0152941 A1* | 6/2015 | Sekiguchi | B62D 5/04 474/205 |
| 2016/0010722 A1* | 1/2016 | Kim | F16G 1/10 474/271 |
| 2017/0045116 A1 | 2/2017 | Kobayashi | |

FOREIGN PATENT DOCUMENTS

| | | | |
|---|---|---|---|
| CN | 107289069 A | 10/2017 | |
| EP | 2803879 A1 * | 11/2014 | F16G 1/08 |
| EP | 2803879 A1 | 11/2014 | |
| EP | 3106712 A1 | 12/2016 | |
| EP | 3434932 A1 | 1/2019 | |
| JP | H11-182632 A | 7/1999 | |
| JP | 2004-308702 A | 11/2004 | |
| JP | 2005-098470 A | 4/2005 | |
| JP | 2005098470 A * | 4/2005 | |
| JP | 2012-225456 A | 11/2012 | |
| JP | 2012225456 A * | 11/2012 | |
| KR | 2004-0092443 A | 11/2004 | |
| KR | 2015-0043316 A | 4/2015 | |
| WO | 2014-024377 A1 | 2/2014 | |
| WO | 2014-091672 A1 | 6/2014 | |
| WO | 2017-164135 A1 | 9/2017 | |

OTHER PUBLICATIONS

Nov. 2, 2021—(CA) Office Action—App 3,069,294.
Dec. 2, 2021—(CN) Notification of Third Office Action—App 201880045726.3, Eng Tran.
Jun. 3, 2021—(CN) Notification of Second Office Action—App 201880045726.3, Eng Tran.
Sep. 18, 2018—International Search Report—Intl App PCT/JP2018/026105.
Feb. 22, 2019—(TW) Office Action—App 107123981.
Jul. 29, 2019—(TW) Office Action—App 107123981.
Oct. 23, 2019—(JP) Notification of Reasons for Refusal—App 2018-121700.
Mar. 26, 2021—(EP) Extended EP Search Report—App 18832375.2.
Apr. 16, 2021—(CA) Office Action—App 3,069,294.
Feb. 23, 2021—(KR) Office Action—App 10-2020-7000453, Eng Tran.

* cited by examiner

HELICAL BELT AND BELT TRANSMISSION GEAR

CROSS REFERENCE TO RELATED APPLICATIONS

This is a U.S. National Phase Application under 35 U.S.C. § 371 of International Application No. PCT/JP2018/026105, filed Jul. 10, 2018, which claims priority to Japanese Application Nos. 2017-135270, filed Jul. 11, 2017, 2018-073854, filed Apr. 6, 2018, and 2018-121700, filed Jun. 27, 2018, which was published Under PCT Article 21(2), the entire contents of which are incorporated herein by reference.

TECHNICAL FIELD

The present invention relates to a helical toothed belt, and particularly to a helical toothed belt which is applied to a belt power transmission device driven with high load or high-speed rotation, and relates to the belt power transmission device.

BACKGROUND ART

For example, in a belt power transmission device driven with high load or high-speed rotation, like in a deceleration device of an electric power steering apparatus, when a straight toothed belt having tooth portions extending in parallel to a belt width direction is used, large noise and vibration are generated at the time of starting and ending of the meshing between the tooth portions of the belt and tooth portions of a pulley. As a countermeasure to this problem, a helical toothed belt in which the tooth portions are disposed obliquely to the belt width direction has been used. In the helical toothed belt, the meshing between the tooth portions thereof and the tooth portions of the pulley progresses sequentially from one end to the other end of the tooth portions. Therefore, noise and vibration can be reduced as compared with a belt power transmission device using the straight toothed belt.

However, even when the helical toothed belt is used, there is a case that noise and vibration cannot be reduced necessarily and sufficiently. To deal therewith, for example, PTLs 1 and 2 propose techniques for further reducing noise and vibration in a belt power transmission device using a helical toothed belt and driven with high load or high-speed rotation.

In PTL 1, a tooth trace angle $\theta$ is set to a value that satisfies $-0.2 \leq 1 - W \cdot \tan \theta / Pt \leq 0.75$ with a tooth pitch being Pt and a belt width being W. In addition, the backlash (gap) between tooth portions of the helical toothed belt and tooth portions of a pulley is set to 1.6% to 3% of the tooth pitch Pt.

In PTL 2, the tooth trace angle $\theta$ is set to 7 degrees or more and 10 degrees or less. In addition, a ratio ($100 \times tb/hb$) of a thickness tb to a tooth height hb is set to 120% or more and 240% or less with the thickness of a back portion being tb and the tooth height of a tooth portion being hb.

Recently, the quietness of vehicles is advancing. Therefore, for example, a belt power transmission device such as a deceleration device of an electric power steering apparatus is required to further reduce noise. However, with the techniques of PTLs 1 and 2, there is a concern that noise and vibration cannot be reduced to a satisfactory level.

CITATION LIST

Patent Literature

PTL 1: JP-A 2004-308702
PTL 2: WO 2014/024377

SUMMARY OF INVENTION

Technical Problem

In this respect, it can be considered to enhance the rigidity (elastic modulus) of the helical toothed belt in order to reduce noise and vibration. As a method for enhancing the rigidity, a method of increasing the thickness (particularly the thickness of a back portion) of the helical toothed belt is provided. However, vibration and noise can be suppressed by this method, but the bendability of the helical toothed belt deteriorates. Thus, bending fatigue on the pulley increases so that the helical toothed belt tends to be cracked particularly in a low temperature environment.

Therefore, an object of the present invention is to provide a helical toothed belt in which rigidity is enhanced without increasing thickness of the helical toothed belt so that noise and vibration can be reduced when the helical toothed belt is used in a belt power transmission device driven with high load or high-speed rotation.

Solution to Problem

According to one configuration of the present invention, provided is a helical toothed belt including:
a back portion in which a tension member is buried; and
a plurality of tooth portions which are arranged at a predetermined interval along a belt longitudinal direction on one surface of the back portion and each have inclination with respect to a belt width direction, in which:
a surface of the tooth portion and a portion of the one surface of the back portion are formed of a tooth fabric;
the plurality of tooth portions have a tooth pitch of 2 mm or more and less than 4 mm,
in a case where the tooth pitch of the plurality of tooth portions is 2 mm or more and less than 3 mm, the back portion has a thickness of 0.4 mm or more and 1.2 mm or less,
in a case where the tooth pitch of the plurality of tooth portions is 3 mm or more and less than 4 mm, the thickness of the back portion is 0.6 mm or more and 1.8 mm or less; and
the tension member is a twisted cord including a high-strength glass fiber or a carbon fiber and having a diameter of 0.2 mm or more and 0.6 mm or less, and the tension member is arranged such that each tension member pitch between adjacent tension member is in a range of 0.45 mm or more and 0.6 mm or less.

With the aforementioned configuration, the surface on the tooth portion side of the back portion is formed of the tooth fabric. Therefore, the back portion is reinforced by the tooth fabric to increase rigidity. Furthermore, the tension member buried in the back portion is a twisted cord including a high-strength glass fiber or carbon fiber which is a high-strength (high elastic modulus) fiber material. The diameter of the twisted cord is 0.2 mm or more and 0.6 mm or less. Therefore, the rigidity of the back portion can be further enhanced by the tension member while securing bendability of the back portion.

The rigidity of the back portion is enhanced as described above. Therefore, even in the case where the helical toothed belt is used in a belt power transmission device driven with high load or high-speed rotation, vibration (string vibration) about the tension member of the helical toothed belt generated when the tooth portions of the helical toothed belt mesh with the tooth portions of the pulley can be suppressed. Therefore, noise generated by the vibration can be reduced.

In addition, the tension member buried in the back portion is arranged such that each tension member pitch between the adjacent tension member is in the range of 0.45 mm or more and 0.6 mm or less. Thus, the rigidity of the helical toothed belt can be further enhanced without further increasing the thickness of the back portion or further increasing the diameter of the tension member (that is, without deteriorating bendability).

In addition, in the case where the tooth pitch is 2 mm or more and less than 3 mm, the thickness of the back portion is 0.4 mm or more and 1.2 mm or less. In the case where the tooth pitch is 3 mm or more and less than 4 mm, the thickness of the back portion is 0.6 mm or more and 1.8 mm or less. These thicknesses are, for example, about the same as the thickness of the back portion of a conventional helical toothed belt used in a deceleration device of an electric power steering apparatus for a vehicle. The helical toothed belt of the present invention can increase the rigidity of the back portion without increasing the thickness of the back portion. Therefore, vibration and noise can be further suppressed while sufficiently securing bending fatigue resistance.

In addition, according to one configuration of the present invention, in the helical toothed belt, the tension member buried in the back portion may be arranged such that the each tension member pitch is a constant value within a range of 0.45 mm or more and 0.6 mm or less, from one end to the other end in the belt width direction of the helical toothed belt.

With the aforementioned configuration, the rigidity of the helical toothed belt can be further enhanced without further increasing the thickness of the back portion or further increasing the diameter of the tension member (that is, without deteriorating bendability). Thus, vibration and noise can be further suppressed.

In addition, according to one configuration of the present invention, in the helical toothed belt, in the case where the tooth pitch of the plurality of tooth portions is 2 mm or more and less than 3 mm, the tooth portion may have a tooth height of 0.7 mm or more and 2.0 mm or less; and in a case where the tooth pitch of the plurality of tooth portions is 3 mm or more and less than 4 mm, the tooth height of the tooth portion may be 1.0 mm or more and 2.3 mm or less.

With the aforementioned configuration, vibration and noise can be further suppressed.

In addition, according to one configuration of the present invention, in the helical toothed belt, the back portion may include a rubber component, and the rubber component may include an ethylene-propylene-diene terpolymer or a hydrogenated nitrile rubber.

With the aforementioned configuration, vibration and noise can be further suppressed.

In addition, according to one configuration of the present invention, in the helical toothed belt, the tooth fabric may be formed of a woven fabric including warp yarns and weft yarns, the warp yarns or the weft yarns may be disposed so as to extend in the belt longitudinal direction, and the warp yarns or weft yarns disposed so as to extend in the belt longitudinal direction may include an elastic yarn having stretchability.

With the aforementioned configuration, vibration and noise can be further suppressed.

In addition, according to one configuration of the present invention, in the helical toothed belt, fibers constituting the tooth fabric may include at least one kind of fibers selected from the group consisting of nylon, aramid, polyester, polybenzoxazole, and cotton.

With the aforementioned configuration, vibration and noise can be further suppressed.

In addition, according to one configuration of the present invention, in the helical toothed belt, the other surface of the back portion may be formed of a back fabric; and fibers constituting the back fabric may include at least one kind of fibers selected from the group consisting of nylon, aramid, and polyester.

With the aforementioned configuration, the other surface of the back portion is formed of a back fabric, and fibers constituting the back fabric include at least one kind of fibers selected from the group consisting of nylon, aramid, and polyester. Therefore, the back portion is further reinforced to enhance the rigidity.

In addition, according to one configuration of the present invention, the helical toothed belt may have a belt elastic modulus of 0.96 MPa or more per belt width of 1 mm.

With the aforementioned configuration, the rigidity of the helical toothed belt can be secured to be high enough to suppress vibration and obtain sufficient quietness.

In addition, according to one configuration of the present invention, provided may be a belt power transmission device including:

a driving pulley that is rotatably driven by a driving source;

a driven pulley; and the helical toothed belt according to any one of the aforementioned configurations, which is wound around the driving pulley and the driven pulley.

With the aforementioned configuration, noise and vibration can be reduced in the belt power transmission device transmitting driving power of the driving pulley to the driven pulley.

In addition, according to one configuration of the present invention, in the belt power transmission device, the rotation speed of the driving pulley may be 1,000 rpm or more and 4,000 rpm or less.

With the aforementioned configuration, noise and vibration can be sufficiently reduced in the belt power transmission device driven with high-speed rotation.

In addition, according to one configuration of the present invention, in the belt power transmission device, the load of the driven pulley may be 0.5 kW or more and 3 kW or less.

With the aforementioned configuration, noise and vibration can be sufficiently reduced in the belt power transmission device driven with high load.

In addition, according to one configuration of the present invention, in the belt power transmission device, the driven pulley may have an outer diameter larger than an outer diameter of the driving pulley; and the belt power transmission device may be a deceleration device of an electric power steering apparatus for a vehicle.

With the aforementioned configuration, noise and vibration can be sufficiently reduced in the deceleration device of an electric power steering apparatus for a vehicle.

Advantageous Effects of Invention

It is possible to provide a helical toothed belt in which rigidity is enhanced without increasing thickness of the helical toothed belt so that noise and vibration can be further reduced when the helical toothed belt is used in a belt power transmission device driven with high load or high-speed rotation.

DESCRIPTION OF EMBODIMENTS

An embodiment of the present invention will be described below. A helical toothed belt 30 according to the present embodiment is used, for example, in a deceleration device 20 of an electric power steering apparatus 1 for a vehicle, illustrated in FIG. 1

(Configuration of Electric Power Steering Apparatus)

Figure 1:
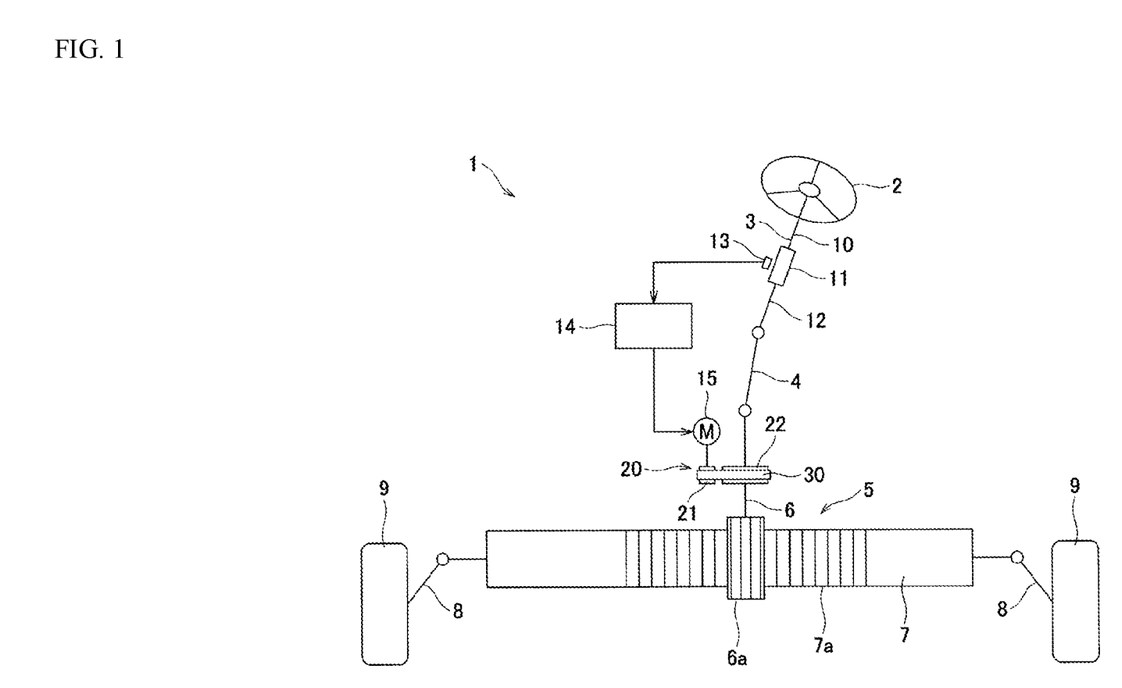
FIG. 1 is a schematic diagram illustrating a schematic configuration of an electric power steering apparatus to which a helical toothed belt of an embodiment of the present invention is applied.

The electric power steering (EPS) apparatus 1 contains a steering shaft 3 that is connected to a steering wheel 2, an intermediate shaft 4 that is connected to the steering shaft 3, and a steering mechanism 5 that is connected to the intermediate shaft 4 and steers wheels 9 by interlocking with the rotation of the steering wheel 2.

The steering mechanism 5 contains a pinion shaft 6 that is connected to the intermediate shaft 4, and a rack shaft 7 that is meshed with the pinion shaft 6. The rack shaft 7 extends along a left-right direction of the vehicle. A rack 7a that meshes with a pinion 6a provided on the pinion shaft 6 is formed in a middle portion of the rack shaft 7 in the axial direction. Wheels 9 are connected to both end portions of the rack shaft 7 via tie rods 8 and knuckle arms (not illustrated). The rotation of the steering wheel 2 is transmitted to the pinion shaft 6 via the steering shaft 3 and the intermediate shaft 4. The rotation of the pinion shaft 6 is converted into the axial movement of the rack shaft 7. As a result, the wheels 9 are steered.

The electric power steering apparatus 1 is configured to obtain a steering assisting force according to the steering torque applied to the steering wheel 2. As a means for this, the electric power steering apparatus 1 contains a torque sensor 13 that detects the steering torque, a control device 14, an electric motor 15 (driving source) for steering assist, and a deceleration device 20 as a transmission device that transmits a driving force of the electric motor 15 to the steering mechanism 5.

In order to detect the steering torque by the torque sensor 13, the steering shaft 3 has an input shaft 10, a torsion bar 11 and an output shaft 12. When the steering wheel 2 is operated and a steering torque is input to the input shaft 10, the torsion bar 11 is twisted and deformed, and the input shaft 10 and the output shaft 12 rotate relatively to each other. The torque sensor 13 detects the steering torque input to the steering wheel 2 based on the relative rotational displacement amount between the input shaft 10 and the output shaft 12. The detection result of the torque sensor 13 is input to the control device 14. The control device 14 controls the electric motor 15 based on the steering torque or the like detected by the torque sensor 13.

Figure 2:
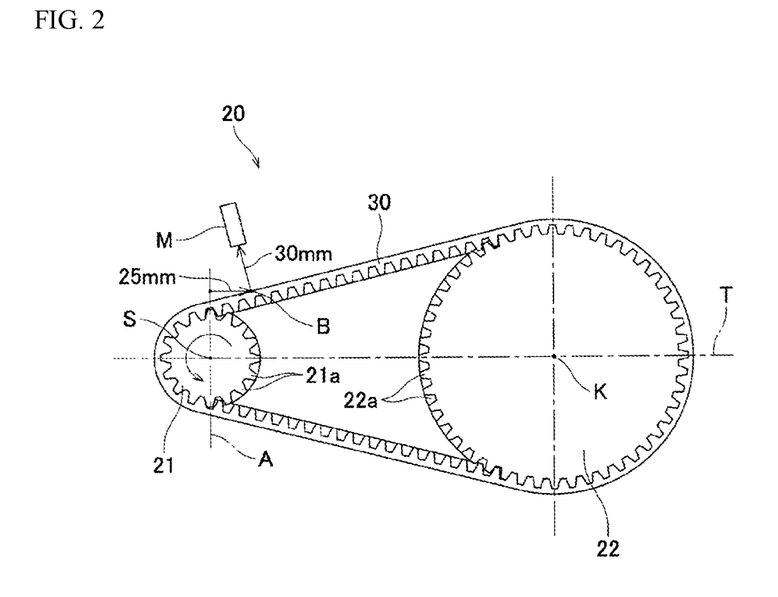
FIG. 2 is a side view illustrating a deceleration device of the electric power steering apparatus.

The deceleration device 20 contains a driving pulley 21, a driven pulley 22, and a helical toothed belt 30 wound around the driving pulley 21 and the driven pulley 22. The driven pulley 22 has an outer diameter larger than that of the driving pulley 21. The driving pulley 21 is fixed to the rotation shaft of the electric motor 15. The driven pulley 22 is fixed to the pinion shaft 6. As illustrated in FIG. 2, a plurality of helical teeth 21a are formed on the outer peripheral surface of the driving pulley 21. A plurality of helical teeth 22a are formed on the outer peripheral surface of the driven pulley 22. The rotation speed of the driving pulley 21 is, for example, 1,000 rpm or more and 4,000 rpm or less. The load of the driven pulley 22 is, for example, 0.5 kW or more and 3 kW or less.

When the steering wheel 2 is operated, the steering torque is detected by the torque sensor 13, and the control device 14 drives the electric motor 15. When the electric motor 15 rotates the driving pulley 21, the helical toothed belt 30 runs, and the driven pulley 22 and the pinion shaft 6 rotate. The rotational force of the electric motor 15 is reduced by the deceleration device 20 and is transmitted to the pinion shaft 6. In addition, as described above, the rotation of the steering wheel 2 is transmitted to the pinion shaft 6 via the steering shaft 3 and the intermediate shaft 4. Then, the rotation of the pinion shaft 6 is converted into the movement of the rack shaft 7 in the axial direction, whereby the wheels 9 are steered. Accordingly, the rotation of the pinion shaft 6 is assisted by the electric motor 15, so that the steering of the driver is assisted.

Incidentally, the configuration of the electric power steering apparatus 1 to which the helical toothed belt 30 of the present invention can be applied is not limited to the configuration illustrated in FIG. 1. For example, the driven pulley 22 of the deceleration device 20 may be fixed to the intermediate shaft 4 or the steering shaft 3. In addition, for example, the driven pulley 22 of the deceleration device 20 may be connected to the rack shaft 7 via a conversion mechanism. The conversion mechanism may be, for example, a ball screw mechanism or a bearing screw mechanism, which converts the rotational force of the driven pulley 22 into a force in the axial direction of the rack shaft 7, and transmits the force to the rack shaft 7.

(Configuration of Helical Toothed Belt)

Figure 3:
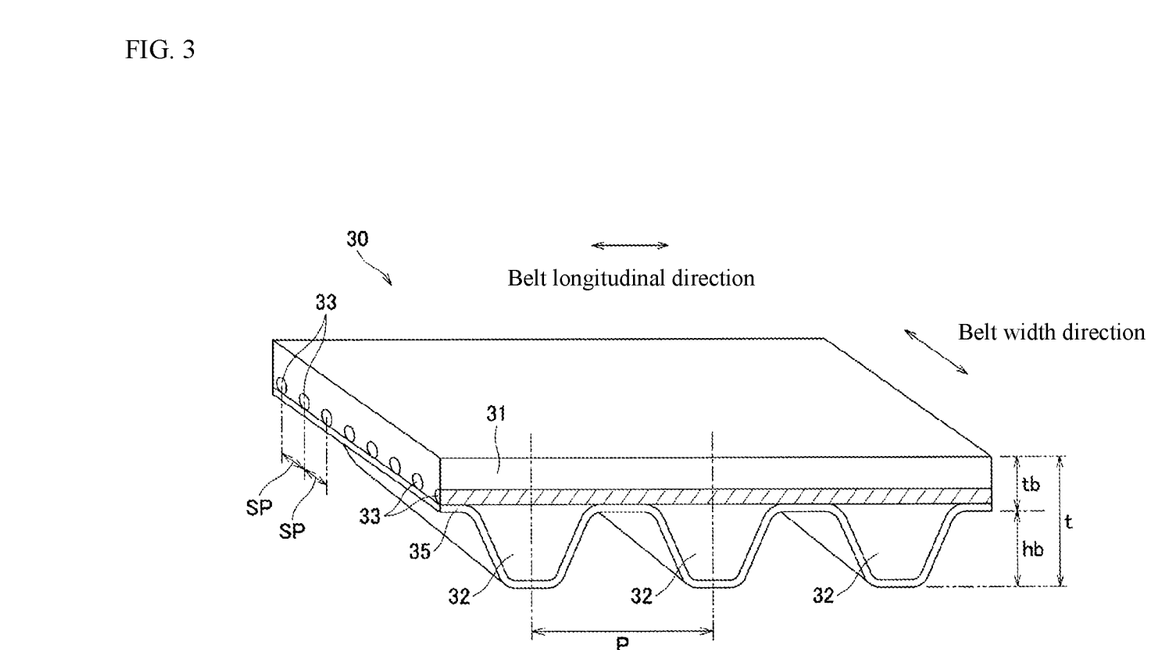
FIG. 3 is a partial perspective view illustrating the helical toothed belt.
Figure 4:
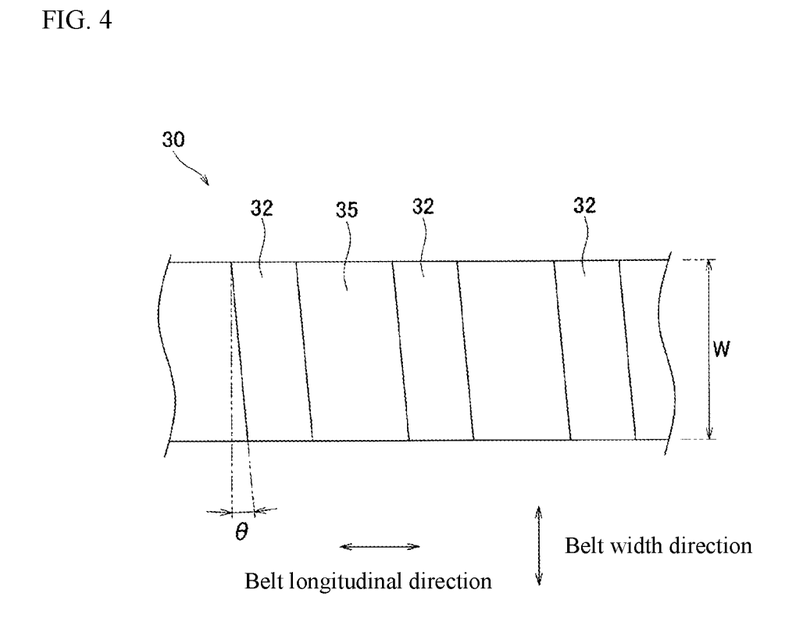
FIG. 4 is a view illustrating the helical toothed belt viewed from the inner peripheral side.

As illustrated in FIG. 3, the helical toothed belt 30 contains a back portion 31 in which a tension member 33 is buried spirally along a belt longitudinal direction, and a plurality of tooth portions 32 provided on the inner peripheral surface of the back portion 31 (corresponding to one surface of the back portion 31) at predetermined intervals along the belt longitudinal direction. In the present embodiment, the plurality of tooth portions 32 are formed integrally with the inner peripheral surface of the back portion 31. In addition, as illustrated in FIG. 4, the tooth portions 32 extend obliquely with respect to the belt width direction. In addition, the inner peripheral surface of the helical toothed belt 30, that is, the surfaces of the tooth portions 32 and a portion of the inner peripheral surface of the back portion 31 are covered with a tooth fabric 35. Incidentally, in the present embodiment, the outer peripheral surface of the back portion 31 (corresponding to the other surface of the back portion 31) is not covered with any fabric or the like. However, the outer peripheral surface of the back portion 31 may be covered with a back fabric.

A perimeter of the helical toothed belt 30 is, for example, from 150 to 400 mm. Incidentally, in the present description, the numerical range represented by "from X to Y" means "X or more and Y or less". The width W (see FIG. 4) of the helical toothed belt 30 is, for example, from 4 to 30 mm. The tooth pitch P (see FIG. 3) of the tooth portions 32 is 2 mm or more and less than 4 mm. In the case where the tooth pitch P is 2 mm or more and less than 3 mm, the thickness tb (see FIG. 3) of the back portion 31 is from 0.4 to 1.2 mm, and preferably 0.6 mm or more and 0.9 mm or less. In the case where the tooth pitch P is 3 mm or more and less than 4 mm, the thickness tb of the back portion 31 is from 0.6 to 1.8 mm, and preferably 0.8 mm or more and 1.2 mm or less. In the case where the tooth pitch P is 2 mm or more and 3 mm or less, the tooth height hb (see FIG. 3) of the tooth portion 32 is, for example, from 0.7 to 2.0 mm, and preferably 0.8 mm or more and 1.0 mm or less. In the case where the tooth pitch P is 3 mm or more and less than 4 mm, the tooth height hb of the tooth portion 32 is, for example, from 1.0 to 2.3 mm, and preferably 1.1 mm or more and 2.0 mm or less. The total thickness (maximum thickness) t (see FIG. 3) of the helical toothed belt 30 is the sum of the thickness tb of the back portion 31 and the tooth height hb. An inclination angle θ (see FIG. 4) of the tooth portion 32 with respect to the belt width direction is, for example, from 2 to 7°, and preferably from 2 to 6°.

(Back Portion and Tooth Portion)

The back portion 31 and the tooth portions 32 are formed of a rubber composition. Examples of rubber components for use in the rubber composition include chloroprene rubber (CR), nitrile rubber, hydrogenated nitrile rubber (HNBR), ethylene-propylene copolymer (EPM), ethylene-propylene-diene terpolymer (EPDM), styrene-butadiene rubber, butyl rubber, and chlorosulfonated polyethylene rubber. The ethylene-propylene-diene terpolymer (EPDM) is a particularly preferred rubber component, and the chloroprene rubber and the hydrogenated nitrile rubber (HNBR) are also preferably used. Although the same rubber composition is used as the rubber composition forming the back portion 31 and the rubber composition forming the tooth portions 32 in the present embodiment, the back portion 31 and the tooth portions 32 may be formed of different rubber compositions.

The rubber composition forming the back portion 31 and the tooth portions 32 may contain various conventional additives (or compounding agents), if necessary. Examples of the additives include vulcanizing agents or crosslinking agents (e.g., oximes (quinone dioxime, etc.), guanidines (diphenylguanidine, etc.)), metal oxides (magnesium oxide, zinc oxide, etc.), vulcanization aids, vulcanization accelerators, vulcanization retarders, reinforcing agents (carbon black, silicon oxide such as hydrated silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softening agents (oils such as paraffin oil and naphthenic oil, etc.), processing agents or processing aids (stearic acid, metal salts of stearic acid, wax, paraffin, etc.), anti-aging agents (aromatic amine type anti-aging agents, benzimidazole type anti-aging agents, etc.), stabilizers (anti-oxidizing agents, ultraviolet absorbers, heat stabilizers, etc.), lubricants, flame retardants, and antistatic agents. These additives can be used singly or in combination, and can be selected according to the kind, application, performance, or the like of the rubber component.

(Tension Member)

Figure 5:
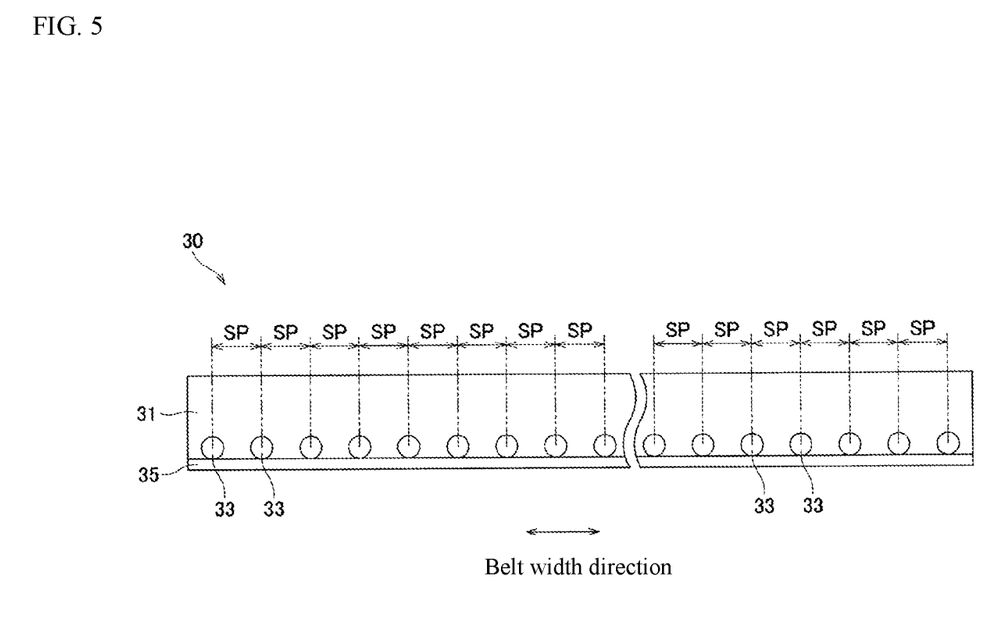
FIG. 5 is a sectional view illustrating the helical toothed belt in a belt width direction.

The tension member 33 is buried in the back portion 31 along the belt longitudinal direction and spirally at intervals (0.45 mm or more and 0.6 mm or less) in the belt width direction. Particularly, as shown in FIG. 3 and FIG. 5, the tension member 33 may be arranged from one end to the other end in the belt width direction of the back portion 31 such that each tension member pitch SP that is a distance between centers of adjacent pieces of the tension member 33 buried spirally takes a constant value within a range of 0.45 mm or more and 0.6 mm or less. Incidentally, in the present description, the apparent number of pieces of the tension member 33 when the pieces of the tension member arranged at the predetermined tension member pitch SP in the belt width direction are observed in sectional view is regarded as "number the tension member" as illustrated in FIG. 5. That is, the number of spiral turns of the tension member 33 buried spirally is regarded as "number of the tension member".

Here, preferably the "number of the tension member" is a value obtained by counting the number of pieces of the tension member (effective member) giving influence to the strength (elastic modulus) of the belt. Accordingly, it is preferable that pieces of the tension member 33 which are disposed at one end and the other end of the back portion 31 of the helical toothed belt 30 and cut out not to be circular in sectional view are not counted as effective member, but pieces of the tension member 33 which are not cut out in sectional view are counted as effective member.

In fact, however, since the tension member 33 is buried spirally, the state that the tension member 33 is arranged differs in accordance with a section taken from the helical toothed belt 30 which is a single endless belt. In addition, even the pieces of the tension member 33 which are cut out not to be circular in sectional view give unignorable influence to the strength (elastic modulus) of the belt. Therefore, in practical use, a value obtained in the following manner may be regarded as approximate "number of the tension member" (effective number) in the case where each tension member pitch SP is a constant value within the range of 0.45 mm or more and 0.6 mm or less. That is, the belt width is divided by the tension member pitch SP (which is a constant value within the range of 0.45 mm or more and 0.6 mm or less), and decimals are rounded down from a value calculated thus. For example, when the belt width is 25 mm and the tension member pitch SP is 0.56 mm, the calculated value is 44.64, and the "number of the tension member" (effective number) is regarded as 44. When the belt width is 25 mm and the tension member pitch SP is 0.52 mm, the calculated value is 48.07, and the "number of the tension member" (effective number) is regarded as 48. When the belt width is 25 mm and the tension member pitch SP is 0.60 mm, the calculated value is 41.67, and the "number of the tension member" (effective number) is regarded as 41.

In addition, the tension member 33 is formed of a twisted cord formed by twisting a plurality of strands. Each single strand may be formed by bundling and aligning filaments (long fibers). The diameter of the tension member 33 is from 0.2 to 0.6 mm There are no particular restrictions on the thickness of each filament forming the twisted cord, the number of filaments converged, the number of strands, and the twisting configuration such as twisting manner. The material of the filaments is high-strength glass fiber or carbon fiber. Both the high-strength glass fiber and the carbon fiber are high in strength and low in elongation, and are suitable as the material of the tension member 33. From the viewpoint of low cost, the high-strength glass fiber is more preferable.

As the high-strength glass fiber, for example, one having a tensile strength of 300 kg/cm$^2$ or more and particularly, the glass fiber having a composition described in the following Table 1 and containing more Si component than non-alkali glass fiber (E glass fiber) can be suitably used. In Table 1 below, the composition of the E glass fiber is also described for comparison. Examples of such high-strength glass fibers include K glass fiber, U glass fiber (both manufactured by Nippon Glass Fiber Co., Ltd.), T glass fiber (manufactured by Nitto Boseki Co., Ltd.), R glass fiber (manufactured by Vetrotex), S glass fiber, S-2 glass fiber, and ZENTRON glass fiber (all manufactured by Owens Corning Fiberglass).

TABLE 1

| Ingredient item | High-strength glass fiber | E glass fiber |
|---|---|---|
| SiO | 58 to 70 | 52 to 56 |
| $Al_2O_3$ | 17 to 27 | 12 to 16 |
| MgO | 7 to 17 | 0 to 6 |
| CaO | 0 to 10 | 12 to 25 |
| $Na_2O$ | 0 to 2 | 0 to 0.8 |
| $K_2O$ | 0 to 2 | 8 to 13 |
| $B_2O_3$ | 0 to 2 | |
| | Impurities such as $Fe_2O_3$ and $TiO_2$ are contained. | |

Examples of such carbon fibers include pitch-based carbon fibers, polyacrylonitrile (PAN)-based carbon fibers, phenolic resin-based carbon fibers, cellulose-based carbon fibers, and polyvinyl alcohol-based carbon fibers. As commercial products of carbon fibers, for example, "TORAYCA (registered trademark)" manufactured by Toray Industries, Inc., "TENAX (registered trademark)" manufactured by Toho Tenax Co., Ltd., "DIALEAD (registered trademark)" manufactured by Mitsubishi Chemical Corporation, etc. can be used. Each of those carbon fibers may be used singly, or two or more kinds of them may be used in combination. Of those carbon fibers, the pitch-based carbon fibers and the PAN-based carbon fibers are preferred, and the PAN-based carbon fibers are particularly preferred.

An adhesive treatment may be applied to the twisted cord used as the tension member 33 so as to enhance the adhesion with the back portion 31. As the adhesive treatment, for example, a method in which the twisted cord is immersed in a resorcinol-formalin-latex treatment liquid (RFL treatment liquid) and then dried by heating to form an adhesive layer uniformly on the surface is adopted. The RFL treatment liquid is obtained by mixing an initial condensate of resorcin and formalin with a latex. Examples of the latex used here include chloroprene, styrene-butadiene-vinylpyridine terpolymer (VP latex), hydrogenated nitrile, and NBR. As the adhesive treatment, there is also a method of pretreating with an epoxy or isocyanate compound and then treating with the RFL treatment liquid, or the like.

(Tooth Fabric)

The tooth fabric 35 is preferably formed of a woven fabric woven by vertically and horizontally interlacing warp yarns and weft yarns according to a predetermined rule. The weaving manner of the woven fabric may be any of twill weave, satin weave and the like. The form of a warp yarn and a weft yarn may be any of a multifilament yarn obtained by aligning or twisting filaments (long fibers), a monofilament yarn as one long fiber, and a spun yarn obtained by twisting short fibers together. In the case where the warp yarn or weft yarn is a multifilament yarn or a spun yarn, it may be a blended twisted yarn or a blended spun yarn using a plurality of types of fibers. The weft yarn preferably contains an elastic yarn having stretchability. As the elastic yarn, for example, use can be made of a material itself having stretchability, such as spandex made of polyurethane, or a processed yarn obtained by stretching (e.g., woolly processing, crimping processing, etc.) of a fiber(s). Normally, the elastic yarn is not used for a warp yarn. Therefore, weaving is easy. As the tooth fabric 35, it is preferable that the warp yarns of the woven fabric are disposed to extend in the belt width direction and the weft yarns are disposed to extend in the belt longitudinal direction. Accordingly, stretchability of the tooth fabric 35 in the belt longitudinal direction can be secured. In the tooth fabric 35, the weft yarns of the woven fabric may be disposed to extend in the belt width direction while the warp yarns are disposed to extend in the belt longitudinal direction. In this case, the elastic yarn having stretchability may be used as the warp yarn. As the material of the fibers constituting the tooth fabric 35, any one or combination of nylon, aramid, polyester, polybenzoxazole, cotton, and the like can be adopted.

The woven fabric used as the tooth fabric 35 may be subjected to an adhesive treatment so as to enhance the adhesion with the back portion 31 and the tooth portions 32. As the adhesive treatment, a method of immersing the woven fabric in a resorcinol-formalin-latex (RFL liquid), and then heating and drying the woven fabric to uniformly form an adhesive layer on the surface thereof is generally used. However, it is not limited thereto, but it is possible to use a method of pretreating the woven fabric with an epoxy or isocyanate compound and then treating the woven fabric with the RFL liquid, as well as a method in which a rubber composition is dissolved in an organic solvent such as methyl ethyl ketone, toluene or xylene to prepare a rubber paste and the woven fabric is dipped in this rubber paste so as to be impregnated with the rubber composition to thereby attach the rubber composition thereto. These methods can be performed singly or in combination, and the order of treatments and the number of treatments are not particularly limited.

(Back Fabric)

Incidentally, the outer peripheral surface of the back portion 31 (corresponding to the other surface of the back portion 31) is not covered with fabric or the like in the present embodiment. However, the outer peripheral surface of the back portion 31 may be covered with a back fabric 36. When the outer peripheral surface of the back portion 31 is covered with the back fabric 36, the back fabric 36 is preferably formed of a knitted fabric knitted with knitting yarns or a woven fabric woven by vertically and horizontally interlacing warp yarns and weft yarns according to a predetermined rule.

The knitted fabric is a fabric having a structure knitted in such a manner that one or two or more knitting yarns form a mesh (loop), and the next yarn is hooked to the loop to form a new loop continuously. In other words, the knitted fabric is formed by making loops without linearly interlacing the yarns. In the case of using a knitted fabric for the back fabric 36, the knitted fabric (or knitting manner of knitted fabric) may be either a weft knitting (or knitted fabric knitted by weft knitting) or a warp knitting (or knitted fabric knitted by warp knitting). The shape of the knitted fabric is not limited but may be a planar shape, a cylindrical shape (circular knitting), and the like. In addition, in the knitted fabric, either a front surface or a back surface may be used as the surface to be bonded to a belt main body. Examples of the weft knitting (or knitting structure of weft knitting) include flat knitting (plain knitting), rubber knitting, pique knitting, smooth knitting, and Jacquard knitting. Examples of the warp knitting (knitting structure of warp knitting) include single denbigh, single cord, tricot, and half tricot.

In the case of using a woven fabric for the back fabric 36, the weaving manner of the woven fabric may be any of plain weave, twill weave, satin weave, and the like. From the viewpoint of securing the bendability of the helical toothed belt 30, the weaving structure or knitting structure is preferably made into a form capable of easily stretching in the belt longitudinal direction so as to be likely to bend in the belt longitudinal direction. It is therefore preferable that a woven fabric containing an elastic yarn having stretchability as the weft yarn is used, and the warp yarns of the woven fabric are disposed to extend in the belt width direction while the weft yarns are disposed to extend in the belt longitudinal direction. The form of the knitting yarn of the knitted fabric or the warp yarn and weft yarn of the woven fabric may be any of a multifilament yarn obtained by aligning or twisting filaments (long fibers), a monofilament yarn as one long fiber, and a spun yarn obtained by twisting short fibers together. In the case where the warp yarn or weft yarn is a multifilament yarn or a spun yarn, it may be a blended twisted yarn or a blended spun yarn using a plurality of types of fibers. As the material of the fibers constituting the back fabric 36, any one or combination of nylon, aramid, polyester and the like can be adopted. In this case, the back portion 31 is further reinforced so that the rigidity of the helical toothed belt 30 can be enhanced.

The woven fabric or knitted fabric used as the back fabric 36 may be subjected to an adhesive treatment so as to enhance the adhesion with the back portion 31. As the adhesive treatment, like in the case of the tooth fabric 35, it is preferable that the fabric is immersed in the resorcinol-formalin-latex (RFL liquid) and then is heated and dried to form an adhesive layer evenly on the surface. However, it is not limited thereto. It is also possible to use a method of pretreating the fabric with an epoxy or isocyanate compound and then treating the fabric with the RFL liquid, as well as a method in which a rubber composition is dissolved in an organic solvent such as methyl ethyl ketone, toluene or xylene to prepare a rubber paste and the fabric is dipped in this rubber paste so as to be impregnated with the rubber composition to thereby attach the rubber composition thereto. These methods can be performed singly or in combination, and the order of treatments and the number of treatments are not particularly limited. In the case where the back fabric 36 is a knitted fabric, in a manufacturing method of the helical toothed belt 30 described below, the unvulcanized rubber sheet wrapped on the knitted fabric in the heating and pressurizing step is impregnated into the knitted fabric. Therefore, the adhesive treatment may not be applied.

(Belt Elastic Modulus of Helical Toothed Belt)

The belt elastic modulus of the helical toothed belt 30 in the belt longitudinal direction is preferably 0.96 MPa or more per belt width of 1 mm, and more preferably in a range of from 0.96 MPa to 1.4 MPa. For example, in a case of a helical toothed belt having a width of 25 mm, the belt elastic modulus is preferably 24 MPa or more, and more preferably in a range of from 24 MPa to 35 MPa. When the belt elastic modulus of the helical toothed belt 30 is set to 0.96 MPa or more per belt width of 1 mm, it is possible to secure rigidity of the helical toothed belt 30 high enough to suppress vibration of the helical toothed belt 30 to thereby obtain sufficient quietness during running of the helical toothed belt 30 which is wound around pulleys.

(Manufacturing Method of Helical Toothed Belt)

The helical toothed belt 30 is produced, for example, by the following procedure.

First, a woven fabric to form the tooth fabric 35, on which an adhesive treatment has been performed, is wound around a cylindrical mold (not illustrated) having a plurality of groove portions corresponding to the plurality of tooth portions 32 of the helical toothed belt 30. Subsequently, a twisted cord to constitute the tension member 33 is spirally spun around the outer peripheral surface of the wound woven fabric. Then, an unvulcanized rubber sheet to form the back portion 31 and the tooth portions 32 is further wound on the outer peripheral side to thereby form an unvulcanized belt molded body.

Incidentally, in the case of covering with the back fabric 36, after the unvulcanized rubber sheet to form the back portion 31 and the tooth portions 32 is wound, a knitted fabric or a woven fabric to form the back fabric 36 is wound on the unvulcanized rubber sheet. In the case where a woven fabric is used as the back fabric 36, the woven fabric has been subjected to an adhesive treatment before it is wound. On the other hand, in the case where a knitted fabric is used as the back fabric 36, such an adhesive treatment may not be performed.

Next, in a state in which the unvulcanized belt molded body is disposed on the outer periphery of the cylindrical mold, a rubber-made jacket which is a steam shielding material is further covered on the outside thereof. Next, the belt molded body and the cylindrical mold covered with the jacket are accommodated inside a vulcanization can. Then, the belt molded body is heated and pressurized inside the vulcanization can so as to vulcanize the rubber sheet. Thus, the rubber composition of the rubber sheet is press-fitted into the groove portions of the mold to form the tooth portions 32. Then, the sleeve-like molded body is released from the mold and cut to a predetermined width so that a plurality of helical toothed belts 30 can be obtained.

In the aforementioned helical toothed belt 30, the surface of the back portion 31 on the tooth portion 32 side is formed of the tooth fabric 35 so that the back portion 31 is reinforced to increase the rigidity. Furthermore, the tension member 33 buried in the back portion 31 is a twisted cord including a high-strength glass fiber or a carbon fiber, which is a high-strength (high elastic modulus) fiber material. The diameter of the twisted cord is 0.2 mm or more and 0.6 mm or less. Therefore, the rigidity of the back portion 31 can be further increased by the tension member 33 while securing the bendability of the back portion 31.

The rigidity of the back portion 31 is increased in this way. Therefore, even in the case where the helical toothed belt 30 is used in the deceleration device 20 driven with a high load or a high-speed rotation, it is possible to suppress vibration (string vibration) about the tension member 33 of the helical toothed belt 30, which is generated when the tooth portions 32 mesh with the tooth portions of the driving pulley 21 or the driven pulley 22. Therefore, noise generated by the vibration can be reduced.

In addition, the tension member 33 buried in the back portion 31 is arranged such that the tension member pitch SP between adjacent tension member is in a range of 0.45 mm or more and 0.6 mm or less. Therefore, the rigidity of the helical toothed belt 30 can be further enhanced without further increasing the thickness of the back portion 31 or further increasing the diameter of the tension member 33 (that is, without deteriorating bendability).

In addition, in the case where the tooth pitch P is 2 mm or more and less than 3 mm, the thickness of the back portion 31 is 0.4 mm or more and 1.2 mm or less. In the case where the tooth pitch P is 3 mm or more and less than 4 mm, the thickness of the back portion 31 is 0.6 mm or more and 1.8 mm or less. These thicknesses are, for example, about the same as the thickness of the back portion of a conventional helical toothed belt used in the deceleration device 20 of the electric power steering apparatus 1 for a vehicle. The helical toothed belt 30 of the present invention can increase the rigidity of the back portion 31 without increasing the thickness of the back portion 31. Therefore, vibration and noise can be more suppressed while sufficiently securing bending fatigue resistance.

Further, noise and vibration can be sufficiently suppressed when the aforementioned helical toothed belt 30 is used in the deceleration device 20 of the electric power steering apparatus 1 for a vehicle where the outer diameter of the driven pulley 22 is larger than the outer diameter of the driving pulley 21.

Although the preferred embodiment of the present invention has been described above, the present invention is not limited to the embodiment described above, but various modifications can be made within the range described in the claims.

Examples

Next, helical toothed belts according to Examples 1 to 17 and Comparative Examples 1 to 6 were manufactured, and belt elastic modulus measurement, sound pressure measurement test and cold endurance test were performed thereon as will be described later.

Twisted cords of A1 to A4 having configurations shown in Table 2 below were prepared as tension members for use in the helical toothed belts of Examples 1 to 17 and Comparative Examples 1 to 6.

The twisted cord of A1 was prepared by the following procedure. Filaments of a glass fiber called KCG 150 in JIS R 3413 (2012) were bundled and aligned to make three strands. These three strands were passed through RFL liquid (18 to 23° C.) having a composition shown in Table 3 below, so as to be immersed therein for 3 seconds. After that, the three strands were heated and dried at 200 to 280° C. for 3 minutes to uniformly form an adhesive layer on their surfaces. After this adhesive treatment, the three strands were twisted with the number of primary twist of 12 times/10 cm, to thereby prepare a twisted cord having a diameter of 0.35 mm Without giving a final twist, the twisted cord was prepared as a single twist. The twisted cords of A2 and A3 were prepared in the same manner as A1, except that the glass fibers were changed to UCG 150 and ECG 150, respectively. The twisted cord of A4 was prepared in the same manner as the tension members of A1 to A3, except that filaments (3K) of carbon fibers were bundled and aligned to form a single strand, which was used as the strand of the twisted cord. The twisted cord was a single twist with a diameter of 0.53 mm

TABLE 2

| (Configuration of Tension Member) | | | | |
|---|---|---|---|---|
| | A1 | A2 | A3 | A4 |
| Material | K glass fiber | U glass fiber | E glass fiber | Carbon fiber |
| Filament diameter (μm) | 9 | 9 | 9 | 7 |
| Strand configuration | KCG150-3/0 | UCG150-3/0 | ECG150-3/0 | 3K-1/0 |
| Number of primary twist (times/10 cm) | 12 | 12 | 12 | 12 |
| Twisting method | Single twist | Single twist | Single twist | Single twist |

TABLE 2-continued

| (Configuration of Tension Member) | | | | |
|---|---|---|---|---|
| | A1 | A2 | A3 | A4 |
| Cord diameter (mm) | 0.35 | 0.35 | 0.35 | 0.53 |
| Elastic modulus (MPa) | 41.5 | 42.8 | 35.5 | 51.9 |

(Elastic Modulus of Tension Member)

Here, a method for measuring the elastic modulus (tensile elastic modulus) of each tension member (longitudinal direction) shown in Table 2 will be described. Chucks were attached to a lower fixation portion and an upper load cell connection portion of an autograph ("AGS-J10 kN" manufactured by Shimadzu Corporation), and a tension member was fixed by the chucks. The upper chuck was moved up to apply stress (about 10 N) to the tension member to prevent the tension member from being loosened. The position of the upper chuck in this state was regarded as initial position. With respect to the initial position, the upper chuck was moved up at a speed of 250 mm/min. Immediately after the stress on the tension member reached 200 N, the upper chuck was moved down to return to the initial position. In a stress-strain curve measured at this time, the slope (average slope) of a straight line in a region having a comparatively linear relation (from 100 to 200 N) was calculated as tensile elastic modulus of the tension member.

TABLE 3

| (RFL Liquid) | |
|---|---|
| | parts by mass |
| Resorcinol | 1.35 |
| Formalin (solid content concentration: 37%) | 1 |
| Vinyl pyridine latex (solid content concentration: 40%) | 130 |
| Water | 50 |

One kind of tooth fabric was used for the helical toothed belts of Examples 1 to 17 and Comparative Examples 1 to 6. For the tooth fabric, a woven fabric of twill weave was used. The warp yarn of the woven fabric was disposed to extend in the belt width direction and the weft yarn thereof was disposed to extend in the belt longitudinal direction. As the weft yarn of the woven fabric, a multifilament yarn of 66 nylon having a fineness of 155 dtex and a multifilament yarn of spandex (polyurethane elastic fiber) having a fineness of 122 dtex were used. As the warp yarn of the woven fabric, a multifilament yarn of 66 nylon having a fineness of 155 dtex was used. Here, dtex (decitex) is the mass of 10,000 meters of the yarn in grams.

The woven fabric used as the tooth fabric was passed through the RFL liquid (18 to 23° C.) shown in Table 3 to be thereby immersed therein for 10 seconds, and then heated at 150 to 170° C. for 3 minutes to be thereby dried. Thus, an adhesive treatment was performed to form an adhesive layer uniformly on the surface of the woven fabric.

An unvulcanized rubber sheet having a composition C1 shown in Table 4 below was prepared as an unvulcanized rubber sheet to form the back portion and the tooth portions in each of the helical toothed belts of Examples 1 to 17 and Comparative Examples 1 to 6.

TABLE 4

(Composition of Unvulcanized Rubber Sheet)

|  | C1 parts by mass |
|---|---|
| EPDM *1 | 100 |
| Adipic acid plasticizer | 0.5 |
| Oil | 8 |
| Anti-aging agent *2 | 2 |
| Vulcanization accelerator *3 | 3.4 |
| Carbon black *4 | 50 |
| Inorganic filler | 5 |
| Zinc oxide *5 | 5 |
| Sulfur | 1 |
| Total | 174.9 |

*1 "EPT" manufactured by Mitsui Chemicals, Inc.
*2 "Nocrack MB" manufactured by Ouchi Shinko Chemical Industrial Co., Ltd.
*3 "N-cyclohexyl-2 benzothiazole sulfenamide" manufactured by Ouchi Shinko Chemical Industrial Co., Ltd.
*4 "Seast 3" manufactured by Tokai Carbon Co., Ltd.
*5 "Zinc oxide third grade" made by Seido Chemical Industry Co., Ltd.

The helical toothed belts of Examples 1 to 17 and Comparative Examples 1 to 6 were prepared by using the twisted cords (tension members) A1 to A4, the tooth fabric, and the unvulcanized rubber sheet of the composition C1, in accordance with the procedure described in the aforementioned embodiment. Vulcanization was performed at 161° C. for 25 minutes. The configurations of the helical toothed belts of Examples 1 to 17 and Comparative Examples 1 to 6 are shown in the following Table 5 to Table 8. The belt widths of the helical toothed belts of Examples 1 to 17 and Comparative Examples 1 to 6 were all set to 25 mm and the inclination angles of the tooth portions with respect to the belt width direction were all set to 5°.

TABLE 5

(Comparison at Tooth Pitch of 2 mm)

|  | Example | | | | | | | Comparative Example | |
|---|---|---|---|---|---|---|---|---|---|
|  | 7 | 2 | 1 | 3 | 4 | 5 | 8 | 1 | 2 |
| Tension member | A1 | | | | A2 | A4 | | A3 | A1 |
|  | (K glass) | | | | (U glass) | (carbon) | | (E glass) | (K glass) |
| Tension member pitch (mm) | 0.48 | 0.52 | 0.56 | 0.60 | 0.52 | 0.56 | 0.60 | 0.52 | 0.64 |
| Effective number of tension member (index) | 52 | 48 | 44 | 41 | 48 | 44 | 41 | 48 | 39 |
| Rubber composition | C1 | | | | | | | C1 | |
| Perimeter (mm) | 340 | | | | | | | 340 | |
| Tooth pitch (mm) | 2 | | | | | | | 2 | |
| Number of teeth | 170 | | | | | | | 170 | |
| Tooth height (mm) | 0.88 | | | | | | | 0.88 | |
| Back portion thickness (mm) | 0.85 | | | | | | | 0.85 | |
| Total thickness (mm) | 1.73 | | | | | | | 1.73 | |
| Belt elastic modulus (MPa) | 27.3 | 26.5 | 25.9 | 24.2 | 29.2 | 32.7 | 30.8 | 23.0 | 23.7 |
| Belt elastic modulus (MPa)/width of 1 mm | 1.09 | 1.06 | 1.04 | 0.968 | 1.17 | 1.31 | 1.23 | 0.920 | 0.948 |
| Sound pressure (dBA) | 58 | 59 | 60 | 62 | 58 | 56 | 60 | 64 | 67 |
| Cold endurance (low temperature durability) | A | A | A | A | A | A | A | A | A |

TABLE 6

(Comparison at Tooth Pitch of 2 mm and Back Portion Thickness of 0.4 to 1.2 mm)

|  | Example | | | Comparative Example |
|---|---|---|---|---|
|  | 9 | 1 | 10 | 3 |
| Tension member | A1 | | | |
|  | (K glass) | | | |
| Tension member pitch (mm) | 0.56 | | | |
| Effective number of tension member (index) | 43 | | | |
| Rubber composition | C1 | | | |
| Perimeter (mm) | 340 | | | |
| Tooth pitch (mm) | 2 | | | |
| Number of teeth | 170 | | | |
| Tooth height (mm) | 0.88 | | | |
| Back portion thickness (mm) | 0.45 | 0.85 | 1.15 | 1.30 |
| Total thickness (mm) | 1.33 | 1.73 | 2.03 | 2.18 |
| Belt elastic modulus (MPa) | 25.9 | 25.9 | 26.2 | 26.3 |
| Belt elastic modulus (MPa)/width of 1 mm | 1.04 | 1.04 | 1.05 | 1.05 |
| Sound pressure (dBA) | 63 | 60 | 59 | 58 |
| Cold endurance (low temperature durability) | A | A | B | C |

TABLE 7

(Comparison at Tooth Pitch of 3 mm)

| | Example | | | | | | Comparative Example | |
|---|---|---|---|---|---|---|---|---|
| | 11 | 6 | 12 | 13 | 14 | 15 | 4 | 5 |
| Tension member | A1 | | | | A4 | | A3 | A1 |
| | (K glass) | | | | (carbon) | | (E glass) | (K glass) |
| Tension member pitch (mm) | 0.48 | 0.52 | 0.56 | 0.60 | 0.56 | 0.60 | 0.52 | 0.64 |
| Effective number of tension member (index) | 52 | 48 | 44 | 41 | 44 | 41 | 48 | 39 |
| Rubber composition | C1 | | | | | | C1 | |
| Perimeter (mm) | 342 | | | | | | 342 | |
| Tooth pitch (mm) | 3 | | | | | | 3 | |
| Number of teeth | 114 | | | | | | 114 | |
| Tooth height (mm) | 1.14 | | | | | | 1.14 | |
| Back portion thickness (mm) | 1.00 | | | | | | 1.00 | |
| Total thickness (mm) | 2.14 | | | | | | 2.14 | |
| Belt elastic modulus (MPa) | 27.4 | 26.5 | 26.0 | 24.2 | 32.8 | 30.9 | 23.1 | 23.7 |
| Belt elastic modulus (MPa)/width of 1 mm | 1.10 | 1.06 | 1.04 | 0.968 | 1.31 | 1.24 | 0.924 | 0.948 |
| Sound pressure (dBA) | 60 | 62 | 62 | 63 | 59 | 60 | 66 | 68 |
| Cold endurance (low temperature durability) | A | A | A | A | A | A | A | A |

TABLE 8

(Comparison at Tooth Pitch of 3 mm and Back Portion Thickness of 0.6 to 1.8 mm)

| | Example | | | Comparative Example |
|---|---|---|---|---|
| | 16 | 6 | 17 | 6 |
| Tension member | A1 | | | |
| | (K glass) | | | |
| Tension member pitch (mm) | 0.52 | | | |
| Effective number of tension member (index) | 48 | | | |
| Rubber composition | C1 | | | |
| Perimeter (mm) | 342 | | | |
| Tooth pitch (mm) | 3 | | | |
| Number of teeth | 114 | | | |
| Tooth height (mm) | 1.00 | | | |
| Back portion thickness (mm) | 0.65 | 1.00 | 1.75 | 1.90 |
| Total thickness (mm) | 1.65 | 2.14 | 2.75 | 2.90 |
| Belt elastic modulus (MPa) | 26.5 | 26.5 | 26.8 | 26.9 |
| Belt elastic modulus (MPa)/width of 1 mm | 1.06 | 1.06 | 1.07 | 1.08 |
| Sound pressure (dBA) | 63 | 62 | 60 | 59 |
| Cold endurance (low temperature durability) | A | A | B | C |

(Measurement of Belt Elastic Modulus)

Belt elastic modulus (tensile elastic modulus) was measured as to each of the helical toothed belts (belt longitudinal direction) of Examples 1 to 17 and Comparative Examples 1 to 6. The method for measuring the belt elastic modulus will be described. A pair of pulleys (30 teeth, outer diameter of 18.6 mm) were attached to a lower fixation portion and an upper load cell connection portion of an autograph ("AGS-J10kN" manufactured by Shimadzu Corporation), and each helical toothed belt was wound on the pulleys. Next, the upper pulley was moved up to apply stress (about 10 N) to the helical toothed belt to prevent the helical toothed belt from being loosened. The position of the upper pulley in this state was regarded as initial position. With respect to the initial position, the upper pulley was moved up at a speed of 50 mm/min. Immediately after the stress on the helical toothed belt reached 500 N, the upper pulley was moved down to return to the initial position. In a stress-strain curve measured at this time, the slope (average slope) of a straight line in a region (from 100 to 500 N) having a comparatively linear relation was calculated as tensile elastic modulus of the belt. Then, when the belt elastic modulus was 24 MPa or more (0.96 MPa or more per belt width of 1 mm), the helical toothed belt was evaluated as high in rigidity.

(Sound Pressure Measurement Test)

A sound pressure measurement test was performed on each of the helical toothed belts of Examples 1 to 17 and Comparative Examples 1 to 6 to evaluate noise during running of the belt. A two-axis running tester was used for the test. Like the deceleration device 20 illustrated in FIG. 2, the two-axis running tester had a configuration including a driving pulley 21 and a driven pulley 22 having a diameter larger than that of the driving pulley 21. A pulley with 40 teeth was used for the driving pulley 21 and a pulley with 107 teeth was used for the driven pulley 22. The helical toothed belt was wound around the two pulleys, and the distance between the shafts of the pulleys was adjusted so that the belt tension was 90 N. With a load of 5 Nm on the driven pulley 22, the driving pulley 21 was rotated at a rotation speed of 1,200 rpm to run the helical toothed belt 30. The ambient temperature was set at 23° C. Then, the sound pressure (noise level) was measured by a sound collecting microphone M of a sound level meter. Just in order to explain the position of the sound collecting microphone M, the sound collecting microphone M is displayed with the deceleration device 20 illustrated in FIG. 2. Specifically the sound collecting microphone M was disposed at a position 30 mm away from a portion B toward the outside in a direction perpendicular to the outer peripheral surface of the helical toothed belt 30. The portion B is a portion in which a straight line A passing through a central position S of the driving pulley 21 and perpendicularly to a straight line T passing through the central portion S of the driving pulley 21 and a central position K of the driven pulley 22 abuts against the outer peripheral surface of the helical toothed belt 30 when the straight line A is moved in parallel toward the driven pulley 22 by 25 mm Measurement results measured by the sound collecting microphone M are shown in Table 5 to Table 8. Sound pressure of 63 dBA or less was regarded as noise level with no problem in practical use of the helical toothed belt, and the helical toothed belt was evaluated as acceptable.

(Cold Endurance Test)

A cold endurance (low temperature durability) test was performed using a two-axis running tester with the same layout as in the aforementioned sound pressure measurement test. The ambient temperature was set to −40° C. The driving pulley 21 was rotated at a rotation speed of 2,000 rpm with no load. Operation of running each helical toothed belt for 6 seconds and then stopping the helical toothed belt for 10 minutes was set as one cycle, and 1,000 cycles were repeated. After performing 500 cycles and after performing 1,000 cycles, it was visually checked whether the surface of the back portion of the helical toothed belt was cracked or not.

The results of the confirmation are shown in Table 5 to Table 8 by use of ranks A, B and C. The rank A designates a case where no crack had been generated yet even in the 1,000th cycle. The rank B designates a case where no crack had not been generated in the 500th cycle yet, but a crack had been generated in the 1,000th cycle. The rank C designates a case where a crack had been already generated in the 500th cycle. As an index of the cold endurance (low temperature durability), when the belts are used in a cold region where the lowest temperature reaches −40° C., belts with the rank B are positioned in worse grade than belts with the rank A, and belts with the rank C are positioned in further worse grade than belts with the rank B, in terms of low temperature durability. From the viewpoint of eligibility for actual use in the cold region where the lowest temperature reaches −40° C., the belts with the rank A or B are preferred, and particularly the belts with the rank A are used preferably.

(Testing in Changing Tension Member Pitch with Tooth Pitch of 2 mm)

In each of Examples 1 to 5, 7 and 8 shown in Table 5, vibration was suppressed to secure the rigidity of the belt (belt elastic module; 24 MPa or more) high enough to obtain sufficient quietness (sound pressure of 63 dBA or less). In Comparative Example 1, in a case of a glass fiber in which the elastic modulus of the tension member was small in spite of a dense tension member pitch, the belt elastic modulus could not be secured to be high enough to suppress vibration (less than 24 MPa), so that the effect of reducing the sound pressure was insufficient. In addition, in Comparative example 2, in which the tension member pitch was large (0.64 mm) in spite of a high-strength glass fiber with a large elastic modulus of the tension member, the belt elastic modulus could not be secured to be high enough to suppress vibration (less than 24 MPa), so that the effect of reducing the sound pressure was insufficient. Accordingly, it could be determined that the lower limit of the elastic modulus (tensile elastic modulus in the longitudinal direction) of the belt effective in suppressing vibration was 24 MPa (0.96 MPa per belt width of 1 mm).

Further, Comparative Example 1 was an example where the tension member A3 of the E glass fiber which was not a high-strength glass fiber was used in the same configuration as Example 2 except for the material of the tension member, but the sound pressure was 64 dBA which was higher than the criterion.

Comparative Example 2 was an example where the tension member pitch SP (0.64 mm) was made larger than that in Comparative Example 1 in the same configuration as Comparative Example 1 except for the material of the tension member. In this case, the sound pressure was higher than the criterion (acceptable in 63 dBA or less).

In each of Examples 1 to 5, 7 and 8, the sound pressure was 63 dBA or less satisfying the criterion.

Examples 2, 3 and 7 had the same configuration as Example 1. Example 2 was an example in which the tension member pitch was made smaller (0.52 mm) than that (0.56 mm) in Example 1. Example 7 was an example in which the tension member pitch was further smaller (0.48 mm) than that in Example 2. Example 3 was an example in which the tension member pitch was larger (0.60 mm) than that in Example 1. Of Examples 7, 2, 1 and 3, Example 7 had the lowest sound pressure (58 dBA).

Example 4 was different from Example 2 only in the kind of fiber constituting the tension member (U glass). Example 5 was different from Example 1 only in the kind of fiber constituting the tension member (carbon). Example 8 was different from Example 3 only in the kind of fiber constituting the tension member (carbon). In Examples 4, 5 and 8, there was not observed a large difference in sound pressure.

From above, it could be confirmed that noise could be suppressed when the tension member pitch was within a range of from 0.45 to 0.6 mm in the case where the tooth pitch was 2 mm.

(Testing in Changing Back Portion Thickness with Tooth Pitch of 2 mm)

As shown in Table 6, in Example 9 where the back portion thickness was smaller (0.45 mm) than that in Example 1 (back portion thickness 0.85 mm), the rigidity of the helical toothed belt was so small that the sound pressure increased to 63 dBA as high as the acceptable limit of the criterion. On the other hand, in Example 10 where the back portion thickness was large (1.15 mm), the sound pressure was reduced to improve the quietness, but the cold endurance deteriorated (evaluated as B). In Comparative Example 3 where the back portion thickness was further larger (1.30 mm), the sound pressure was further reduced, but the cold endurance further deteriorated (evaluated as C). The back portion thickness (0.85 mm) in Example 1 balanced totally was the best.

Incidentally, deterioration in cold endurance means that a failure such as cracking tends to occur in use (bending running) under a low temperature environment. When a helical toothed belt is used in application for a vehicle, cold endurance is also important on the assumption that it may be used in a cold region (for example, −40° C.). In the aforementioned Examples 1, 9 and 10 and Comparative Example 3, when the back portion thickness is reduced, the sound pressure increases to deteriorate the quietness. However, the cold endurance is improved owing to reduction in rigidity (improvement in bendability) of the helical toothed belt. On the contrary, when the back portion thickness is increased, the sound pressure decreases to improve the quietness. However, the rigidity of the helical toothed belt is increased (the bendability is reduced) so that the cold endurance deteriorates. Accordingly, as for the back portion thickness, an upper and lower limit thereof is important. With reference to the aforementioned Examples 1, 9 and 10 and Comparative Example 3, it can be considered that the fine back portion thickness is from 0.4 to 1.2 mm, and preferably from 0.6 mm to 0.9 mm in the case where the tooth pitch is 2 mm or more and less than 3 mm.

(Testing in Changing Tension Member Pitch with Tooth Pitch of 3 mm)

In each of Examples 6 and 11 to 15 shown in Table 7, vibration was suppressed to secure the rigidity of the belt (belt elastic module; 24 MPa or more) high enough to obtain sufficient quietness (sound pressure of 63 dBA or less). In Comparative Example 4, in a case of a glass fiber in which the elastic modulus of the tension member was small in spite of a dense tension member pitch, the belt elastic modulus could not be secured to be high enough to suppress vibration (less than 24 MPa), so that the effect of reducing the sound pressure was insufficient. In addition, in Comparative example 5, in which the tension member pitch was large (0.64 mm) in spite of a high-strength glass fiber with a large elastic modulus of the tension member, the belt elastic modulus could not be secured to be high enough to suppress vibration (less than 24 MPa), so that the effect of reducing the sound pressure was insufficient. Accordingly, it could be determined that the lower limit of the elastic modulus (tensile elastic modulus in the longitudinal direction) of the belt effective in suppressing vibration was 24 MPa (0.96 MPa per belt width of 1 mm).

Further, Comparative Example 4 was an example where the tension member A3 of the E glass fiber which was not a high-strength glass fiber was used in the same configuration as Example 6 except for the material of the tension member, but the sound pressure was 66 dBA which was higher than the criterion.

Comparative Example 5 was an example where the tension member pitch SP (0.64 mm) was made larger than that in Comparative Example 4 in the same configuration as Comparative Example 4 except for the material of the tension member. In this case, the sound pressure was higher than the criterion (acceptable in 63 dBA or less).

In each of Examples 6 and 11 to 15, the sound pressure was 63 dBA or less satisfying the criterion.

Examples 6, 13 and 11 had the same configuration as Example 12. Example 6 was an example in which the tension member pitch was made smaller (0.52 mm) than that (0.56 mm) in Example 12. Example 11 was an example in which the tension member pitch was further smaller (0.48 mm) than that in Example 6. Example 13 was an example in which the tension member pitch was larger (0.60 mm) than that in Example 12. Among Examples 6 and 11 to 13, Example 11 had the lowest sound pressure (60 dBA).

Example 14 was different from Example 12 only in the kind of fiber constituting the tension member (carbon). Example 15 was different from Example 13 only in the kind of fiber constituting the tension member (carbon). In Examples 14 and 15, there was not observed a large difference in sound pressure, but the sound pressure in each example was as low as that in Example 11.

From above, it could be confirmed that noise could be suppressed when the tension member pitch was within a range of from 0.45 to 0.6 mm in the case where the tooth pitch was 3 mm.

(Testing in Changing Back Portion Thickness with Tooth Pitch of 3 mm)

As shown in Table 8, in Example 16 where the back portion thickness was smaller (0.65 mm) than that in Example 6 (back portion thickness 1.00 mm), the rigidity of the helical toothed belt was so small that the sound pressure increased to 63 dBA as high as the acceptable limit of the criterion. On the other hand, in Example 17 where the back portion thickness was large (1.75 mm), the sound pressure was reduced to improve the quietness, but the cold endurance deteriorated (evaluated as B). In Comparative Example 6 where the back portion thickness was further larger (1.90 mm), the sound pressure was further reduced, but the cold endurance further deteriorated (evaluated as C). The back portion thickness (1.00 mm) in Example 6 balanced totally was the best.

Accordingly, with reference to the aforementioned Examples 6, 16 and 17 and Comparative Example 6, it can be considered that the fine back portion thickness is from 0.6 to 1.8 mm, and preferably from 0.8 mm to 1.2 mm in the case where the tooth pitch is 3 mm or more and less than 4 mm.

Although description has been made about the preferred embodiment of the present invention, the invention is not limited to the embodiment, but various changes on design can be made within the scope described in the claims. The present application is based on Japanese Patent Application No. 2017-135270 filed on Jul. 11, 2017, Japanese Patent Application No. 2018-073854 filed on Apr. 6, 2018, and Japanese Patent Application No. 2018-121700 filed on Jun. 27, 2018, the contents of which are incorporated herein by reference.

REFERENCE SIGNS LIST 1 electric power steering apparatus
15 electric motor (driving source)
20 deceleration device (belt power transmission device)
21 driving pulley
22 driven pulley
30 helical toothed belt
31 back portion
32 tooth portion
33 tension member
35 tooth fabric
P tooth pitch
SP tension member pitch

The invention claimed is:

1. A belt power transmission device comprising:
   a driving pulley that is rotatably driven by a driving source;
   a driven pulley, wherein a load of the driven pulley is 0.5 kW or more and 3 kW or less; and
   a helical toothed belt comprising:
      a back portion in which a tension member is buried; and
      a plurality of tooth portions, each tooth portion being arranged at a predetermined interval along a belt longitudinal direction on one surface of the back portion, and each tooth portion being inclined with respect to a belt width direction, wherein:
      a surface of the tooth portions and a portion of the one surface of the back portion are formed of a tooth fabric;
      the plurality of tooth portions have a tooth pitch of 2 mm or more and less than 4 mm,
         in a case where the tooth pitch of the plurality of tooth portions is 2 mm or more and less than 3 mm, the back portion has a thickness of 0.4 mm or more and 1.2 mm or less,
         in a case where the tooth pitch of the plurality of tooth portions is 3 mm or more and less than 4 mm, the thickness of the back portion is 0.6 mm or more and 1.8 mm or less; and
      the tension member is a twisted cord comprising a high-strength glass fiber or a carbon fiber and having a diameter of 0.2 mm or more and 0.6 mm or less, and the tension member is arranged such that each tension member pitch between adjacent tension members is in a range of 0.45 mm or more and 0.6 mm or less.

2. The belt power transmission device according to claim 1, wherein the tension member buried in the back portion of the helical toothed belt is arranged such that each tension member pitch is a constant value within a range of 0.45 mm or more and 0.6 mm or less, from one end to the other end in the belt width direction of the helical toothed belt.

3. The belt power transmission device according to claim 1, wherein:
  in the case where the tooth pitch of the plurality of tooth portions is 2 mm or more and less than 3 mm, each tooth portion has a tooth height of 0.7 mm or more and 2.0 mm or less; and
  in the case where the tooth pitch of the plurality of tooth portions is 3 mm or more and less than 4 mm, the tooth height of each tooth portion is 1.0 mm or more and 2.3 mm or less.

4. The belt power transmission device according to claim 1, wherein the back portion of the helical toothed belt comprises a rubber component, and the rubber component comprises an ethylene-propylene-diene terpolymer or a hydrogenated nitrile rubber.

5. The belt power transmission device according to claim 1, wherein:
  the tooth fabric is formed of a woven fabric comprising warp yarns and weft yarns;
  the warp yarns or the weft yarns are disposed so as to extend in the belt longitudinal direction; and
  the warp yarns or weft yarns disposed so as to extend in the belt longitudinal direction comprise an elastic yarn having stretchability.

6. The belt power transmission device according to claim 1, wherein fibers constituting the tooth fabric comprise at least one kind of fibers selected from the group consisting of nylon, aramid, polyester, polybenzoxazole, and cotton.

7. The belt power transmission device according to claim 1, wherein:
  the other surface of the back portion is formed of a back fabric; and
  fibers constituting the back fabric of the helical toothed belt comprise at least one kind of fibers selected from the group consisting of nylon, aramid, and polyester.

8. The belt power transmission device according to claim 1, wherein the helical toothed belt has a belt elastic modulus of 0.96 MPa or more per belt width of 1 mm.

9. The belt power transmission device according claim 1, wherein a rotation speed of the driving pulley is 1,000 rpm or more and 4,000 rpm or less.

10. The belt power transmission device according to claim 1, wherein:
  the driven pulley has an outer diameter larger than an outer diameter of the driving pulley; and
  the belt power transmission device is a deceleration device of an electric power steering apparatus for a vehicle.

* * * * *